June 11, 1957 H. GANSWINDT ET AL 2,795,726
SCREEN-MESH ELECTRODE FOR ELECTRICAL DISCHARGE TUBES
Filed Jan. 12, 1951 4 Sheets-Sheet 2

Inventors.
Hartmut Ganswindt &
Werner Mueller.
By
Atty.

June 11, 1957     H. GANSWINDT ET AL     2,795,726
SCREEN-MESH ELECTRODE FOR ELECTRICAL DISCHARGE TUBES
Filed Jan. 12, 1951     4 Sheets-Sheet 3

Inventors.
Hartmut Ganswindt, &
Werner Mueller.
By.
Atty.

June 11, 1957 — H. GANSWINDT ET AL — 2,795,726
SCREEN-MESH ELECTRODE FOR ELECTRICAL DISCHARGE TUBES
Filed Jan. 12, 1951 — 4 Sheets-Sheet 4

Inventors,
Hartmut Ganswindt, &
Werner Mueller.
By

Atty.

2,795,726

SCREEN-MESH ELECTRODE FOR ELECTRICAL DISCHARGE TUBES

Hartmut Ganswindt, Berlin-Spandau, and Werner Müller, Berlin-Siemensstadt, Germany, assignors to Siemens & Halske Aktiengesellschaft, Munich, Germany, a corporation of Germany Application January 12, 1951, Serial No. 205,668

Claims priority, application Germany January 16, 1950

5 Claims. (Cl. 313—356)

This invention is concerned with a screen-mesh electrode for discharge tubes, which is particularly suitable for use as a grid or as a cathode.

An object of the invention is to provide an electrode comprising a structure similar to a screen-mesh, self-supporting, for example, without any supporting ribs or the like, and in tubular form. The advantage resulting from the omission of supporting ribs is, among others, that the entire electrode surface can be operatively utilized. The tubular structure may be cross-sectionally circular, elliptical or of any other desired shape, depending on the purpose to which it is put.

Another object of the invention is to produce an electrode, as indicated in the preceding paragraph, which is provided at least at one end with a tubular coaxial extension serving as a securing and as a terminal means which provides for as smooth as possible a transition of the operating current to the screen-mesh element.

The structure noted above is particularly advantageous when working with high and highest frequencies because it avoids coupling points for the high-frequency currents such as are present in electrode structures comprising, for example, grids formed by sheet cylinders having supporting ribs which serve as current supply terminals. The required mechanical strength, which until now was obtained by means of longitudinal supporting ribs, is obtained in the new structure by a multiplicity of thin mutually crossing wires. The individual wires of the screen-mesh may easily be fastened to the coaxial terminal extension so as to secure the required mechanical strength of the entire electrode structure.

The above noted and additional objects and features of the invention will be brought out in the detailed description which will presently be rendered with reference to the accompanying drawings. In these drawings, Fig. 1 shows a transmitter tube, indicating the essential parts thereof partially in section and partially in elevation, the tube comprising a control grid which is, in accordance with the invention, of the screen-mesh type and of tubular shape;

Figs. 2 and 3 indicate in perspective view two embodiments of grid electrodes which are applicable in the tube shown in Fig. 1;

Figure 4:
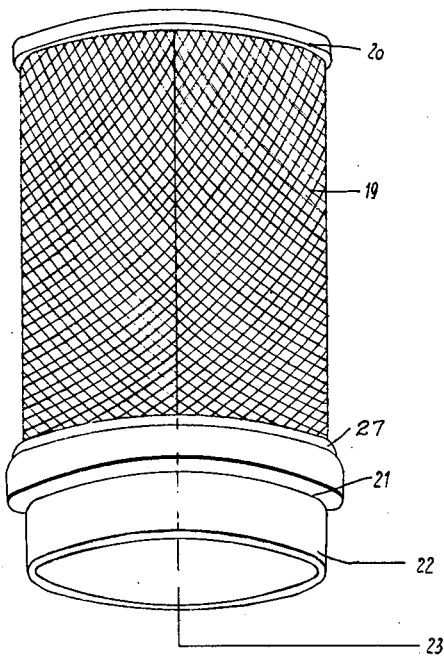
Fig. 4 illustrates an embodiment of a screen-mesh cathode.
Figure 5:
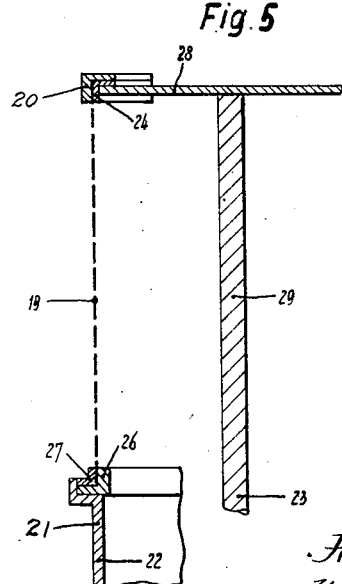
Figure 7:
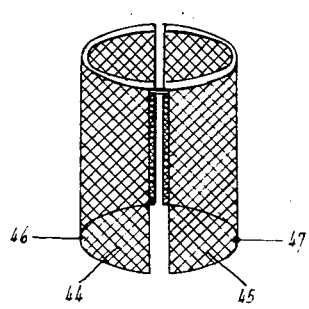
Figure 8:
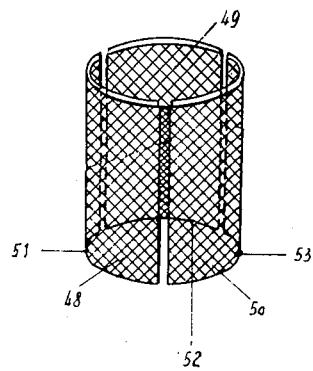
Figure 9:
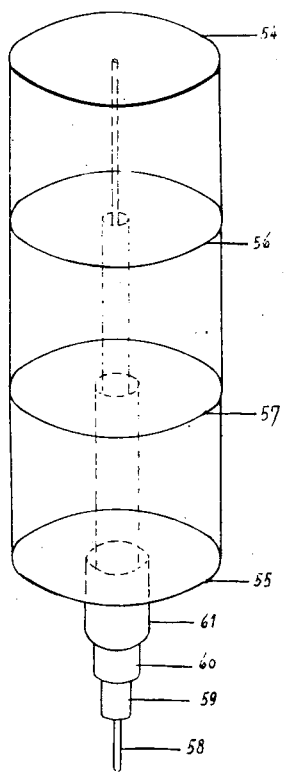
Figure 6:
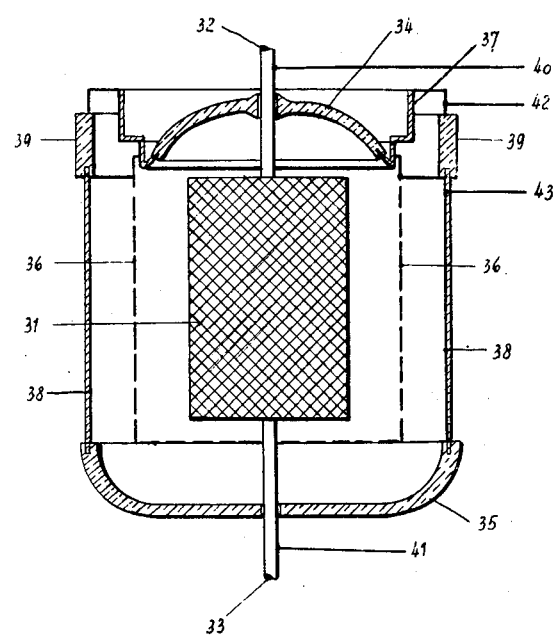
Figure 6:

Fig. 5 indicates the manner of mounting the cathode of Fig. 4;

Fig. 6 shows in like diagrammatic manner how a screen-mesh cathode may be mounted in a tube in vacuum-tight relationship; and Figs. 7, 8 and 9 show modifications.

Figure 1:
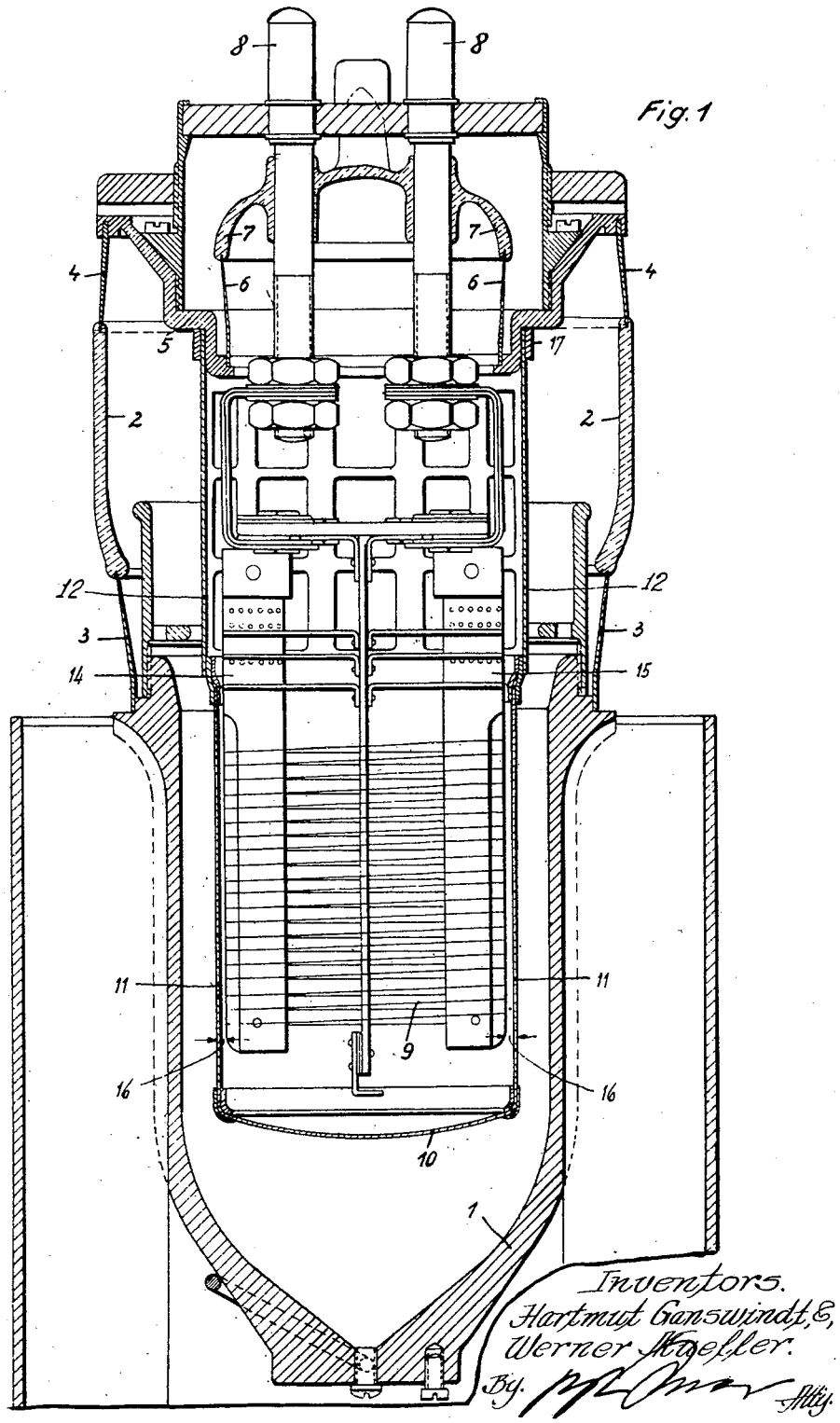

The structure illustrated in Fig. 1 is assumed to be an air-cooled transmitter tube. The anode cylinder 1 is provided with cooling fins. It may be made of copper and may form part of the tube wall. A portion 2 of the tube wall, disposed above the cylinder 1, is made of glass for the purpose of isolating the anode from the remaining electrodes. The glass portion 2 is fused to a copper ring 3 which connects with the anode 1 and is similarly fused at its other end to a copper ring 4. Soldered to the latter is a stepped circular copper member 5. Connected in vacuum-tight manner with the inner margin of the copper member 5 over a tubular copper member 6 is a glass dome 7 carrying terminal pins 8. These pins in turn carry a cathode structure 9. The grid electrode comprising the parts 10—11—12, is formed in the manner of a screen-mesh, and is fastened to the copper member 5 by means of a ring 17 (see also Figs. 2, 2a and 3) the member 5 being fused to the glass dome 7 and sealing the tube to the outside.

Figure 2:
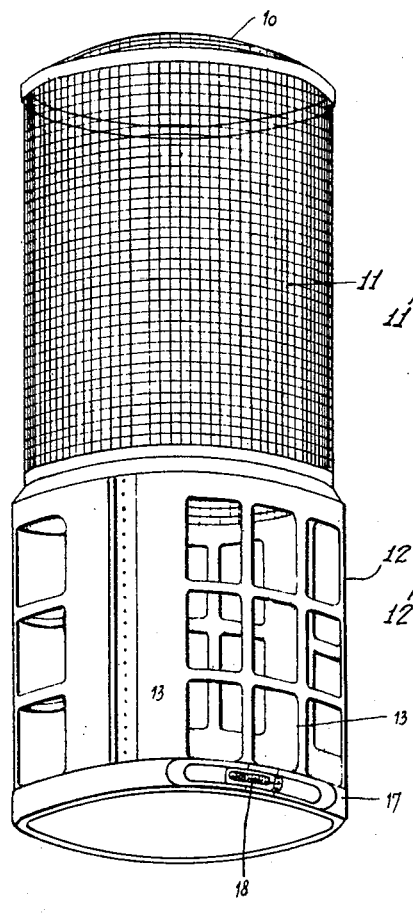
Fig. 2a shows a detail of Fig. 2.
Figure 3:
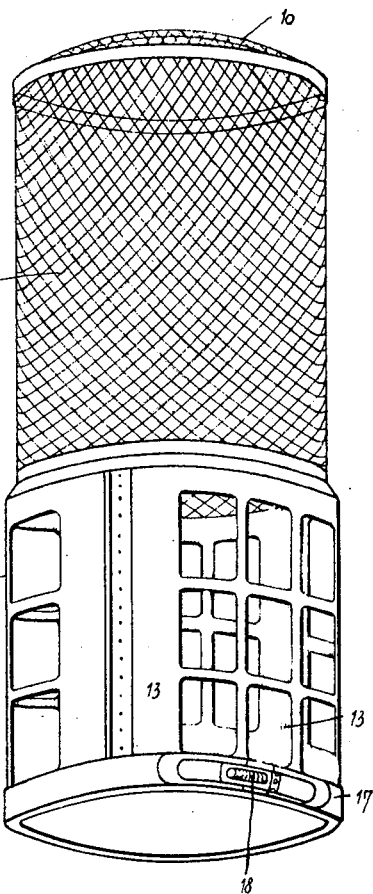
Figure 2A:
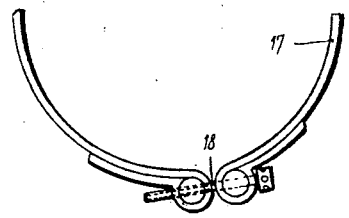

The grid electrode comprising the parts 10—11—12 is separately shown in Fig. 2 in perspective view, Fig. 2a showing a detail thereof, and a somewhat modified form thereof is shown in Fig. 3. Identical parts are indicated in these figures by identical reference numerals.

The tubular wire cage 11, forming a screen-mesh grid, is made of tantalum wires which are secured together at each individual crossing point, for example, by welding. Secured to the tubular wire cage, for example, by welding, is the tubular holder 12 which is made of tantalum and provided with windowlike openings. The holder 12 serves as a current supply terminal and as a mounting means for the screen-mesh grid 10—11. The vertically extending striplike portions 13 of the holder 12, which are disposed opposite the current supply means 14—15 of the cathode, are wider than the remaining vertically extending striplike portions defining the window openings.

The manner of mounting the grid electrode, with the screen-mesh 11 relatively slightly spaced from the current supply members of the cathode, as indicated in Fig. 1 at 16, results in a considerable reduction of the inductance with only a slight increase in the capacitance.

The holder 12 is secured to the neck formed by the circular copper member 5 (Fig. 1) by means of a ring or band 17 which is clamped together by a screw 18 (see Figs. 2 and 2a). The high-frequency alternating current passes to the screen-mesh electrode without being impeded by coupling points, due to the tubular formation of the mounting.

In order to avoid deformation of the screen-mesh grid structure by heating, which might cause contact between the grid and the cathode, the sections of the longitudinally disposed wires, which lie between the laterally disposed cross wires, are suitably curved or bent outwardly so that they can expand outwardly when heated.

The above noted action, namely, expansion of wire sections responsive to heating may, however, also be accomplished without bending such wire sections outwardly, by disposing the wires in crosswise manner, as shown by way of example in perspective view in Fig. 3. None of the wires extend in this embodiment in parallel with the axis of the screen-mesh. The wires may be welded together at each individual crossing point as in the previously explained example. The electrode shown in this figure has substantially the same dimensions and general elements as the one illustrated in Fig. 2, and corresponding parts are therefore indicated by like reference numerals.

The remaining figures indicate embodiments and modifications adapted to employ the screen-mesh structure as a cathode. In the case of heavy duty tubes, for example, transmitter tubes, the requirements put on the cathode are, in respect of electrical and mechanical features generally identical and in part even higher than in the case of a grid. The danger of deformation of the cathode is, for example, greater because of higher operating temperatures. The tubular screen mesh structure avoids such and other drawbacks. The individual mesh wires form the heating filaments. Such a cathode will have high mechanical strength due to the crosswise arrangement of the filaments and structure is also easier to manufacture as compared with the usual cathode structures, comprising parallel supporting ribs disposed on a circular carrier for mounting the heating filament windings.

Fig. 4 shows in perspective representation an embodiment of such a cathode which comprises a screen-mesh consisting of wires which are elliptically disposed in mutually crossing relationship as in Fig. 3 and form heating filaments 19. The screen mesh may also be formed of a plurality of right or left hand spiral turns extending in mutually crossing relationship or of elliptically formed sections. The heating filaments 19 may be made of tungsten wire and secured together at their crossing points as mentioned before. The upper end of the tubular screen-mesh is terminated by a metallic disk 20 and the lower end by a holder formed by a metallic holder 21. Numerals 22, 23 indicate current supply leads connected with the holder 21 and the disk 20, respectively. Instead of disposing the heating filaments in elliptical paths or mutually crossing right and left hand turns, they may be arranged as discussed in connection with Fig. 2, with wire sections extending between crossing points bent outwardly to provide for expansion responsive to heating.

The mechanical arrangement of a screen-mesh cathode according to Fig. 4 is diagrammatically indicated in Fig. 5. The tubular screen-mesh, formed by the heating filaments 19 shown in prominent dotted line, is gripped at the opposite ends by angular tantalum rings 20 and 25 and 26—27, respectively, which are welded together so as to obtain good conductive connection. The tantalum rings 20 and 25 at the upper end, which are only partially indicated, are connected in suitable manner in good conductive relationship with a nickel disk 28. The latter is carried by a nickel rod 29 which in turn connects with the current supply conductor 23 (see also Fig. 4). Connected with the partially illustrated tantalum rings 26—27 at the lower end of the structure is a nickel ring 21 (holder) which is peened over the tantalum rings 26 and 27, forming a good conductive joint therewith. Secured to this holder 21 is the current supply conductor 22 (see also Fig. 4).

The above described structure furnishes a cathode of great surface area with short axial dimensions, without requiring auxiliary elements for the heating filaments or for the support thereof. The characteristic of the cathode corresponds to that of an equipotential cathode.

Instead of welding the individual filaments together or to associated metallic parts, it is also possible to establish the corresponding connections by soldering or by clamping or twining the parts together. The danger of damaging the relatively brittle filament wires is lessened in the case of soldering, clamping or twining them together because lower temperatures are employed in soldering than in welding, and the clamping or twining the parts together can be accomplished at room temperatures, thus avoiding stresses resulting from heating.

Another advantage resulting from establishing the connections by soldering is that the heating filaments need not be covered at each end of the screen-mesh by a pair of metallic rings, as would be required in the case of welding. A single ring may be soldered to the end of the screen-mesh, which is easily accomplished and easier to observe than the welding between two metallic rings. The soldering may be carried out in a vacuum by means of high-frequency heating.

The provision of ring-shaped mounting or fastening elements at each end of a tubular screen-mesh structure facilitates the mounting of the electrode. For example, it is possible to fuse the tubular screen-mesh electrode at its two ends into the envelope of a tube in a vacuum-tight manner and in insulated relation to the remaining electrodes. An example of such an embodiment is shown in schematic manner in Fig. 6.

The tubular screen-mesh cathode 31 of Fig. 6 is provided at its opposite ends with connecting pins or rods 32—33, which are fused vacuum-tight within the glass hoods 34—35, respectively. The glass hood 34 is fused together in vacuum-tight manner with a metallic ring 37 carrying the grid 36 shown in prominent dash lines. The metallic ring 37 is fused to the upper end of the anode cylinder 38 through the medium of the cylindrical glass member 39. The bottom glass hood 35 is fused vacuum-tight with the lower end of the anode cylinder 38. Secured to the connecting pins or rods 32—33 are current supply conductors 40—41. The grid 36 is supplied with current over the conductor 42 and the anode 38 over the conductor 43.

The above described embodiment, due to the fusing with the tube vessel of the tubular screen-mesh cathode at both ends thereof, makes it possible to form the individual electrodes concentrically, thus avoiding high-frequency coupling points. In addition, the inlet inductance for the cathode is small, due to the uniformly and identically extending current inlet and outlet for such cathode.

It may be desirable in some cases to subdivide the screen-mesh cathode for the heating current flowing therethrough. Such a subdivision may be longitudinal, crosswise, or a combination of both. Examples of such embodiments appear from Figs. 7, 8 and 9.

In Fig. 7, the tubular screen-mesh cathode is simply longitudinally subdivided by a slot. The cathode thus comprises two semi-spherical or semi-elliptoid partial cathodes 44—45 whose upper portions are conductively connected, while the lower portions are provided with current supply leads 46—47. As compared with a nonsubdivided cathode, this structure will operate with higher heating voltage at lower heating current.

If the screen-mesh cathode is longitudinally slotted at a plurality of points, for example, at three points, as shown in Fig. 8, it may be supplied with current from a three-pole circuit. There are in this structure three partial cathodes 48—49—50. The upper portions of these cathodes are conductively connected, and the lower portions carry the current supply leads 51—52—53.

Since there is no electron emission at the slots, special electrodes, e. g., screen grids or desired control grids, may be provided thereat which are designed to absorb as small an emission current as possible. It is likewise possible to provide along the slots mounting or fastening ribs for electrodes, thus reducing the effect of the electrons which until now required the provision of other special means.

In place of the subdivision by longitudinally slotting, there may be provided an axially successive subdivision, as schematically indicated in Fig. 9.

The screen-mesh cathode comprises in this case a cage having a plurality of parts. The cage is closed at its ends by suitable annular members, and is at various points subdivided by similar intermediate members. At the opposite ends are provided the current supply terminals 54—55 which also serve as stiffening means. Similar terminals 56—57 are provided for the intermediate members. Numerals 58—59—60—61 indicate current supply terminals formed by concentrically disposed telescoping tubular members. The heating of the top portion is carried out through the medium of the terminals 58—59; the central portion receives heating current through the medium of the terminals 59—60; and the lower portion is heated through the medium of terminals 60—61.

The current supply elements within the structure may be in the form of disks to obtain greater stability of the entire cathode system, despite the considerable length of the structure which is adapted for heavy duty tubes.

It is also possible, in accordance with the invention, to construct a tubular screen-mesh cathode in a plurality of, for example, three, individual axially separate, axially superposed cage portions. Electrically conductive means may then be employed to connect the cage portions at marginally adjacent parts thereof in order to provide for a current supply such as indicated in Fig. 9.

The examples illustrated in Figs. 1-9 show cross-sectionally substantially circular screen-mesh electrodes. It is understood of course that such electrodes may be formed of surface areas having different curvature radii resulting, for example, in a cross-sectionally elliptical shape. Such shape is particularly suitable, for example, for tubes in which certain electrodes are designed for absorbing very small emission current, as is desirable, for example, in the case of tubes having control and screen grids. Electrodes of this kind, which are intended for a very slight electronic action, may be disposed in the tube at places of least emission, that is, at places containing the surfaces with the smallest curvature radii.

The use of a screen-mesh cathode of cross-sectionally elliptical shape is, however, of advantage also in the case of tubes which do not have such control and screen grids, because they will make it possible to dispose supporting ribs or the like, for example, at points lying opposite the points of the smallest curvature radii. Supporting or fastening ribs may, for example, be disposed at such points, making it possible to reduce the electron impact, thus avoiding the necessity to use, as was the case until now, oxide cathodes with differentiated emission, or to provide protective screens or other similarly operative measures. The tube may, for example, comprise a screen-mesh cathode of cross-sectionally elliptical shape surrounded by one or more grids of similar cross-sectional form. The anode may have similar cross-sectional shape. At the two places lying opposite the surfaces having the smallest curvature radii may be provided correspondingly shaped sheet material shields operating as control grids or the like. The supporting or mounting ribs of grid electrons, if such are used, may be disposed at such places in suitably similar manner.

Changes may be made within the scope and spirit of the appended claims.

We claim:

1. An electrode for use in an electron discharge tube comprising a tubular screen-mesh element, said screen-mesh element comprising wires disposed in mutually crossing relationship, said wires being secured together at crossing points thereof, an integral tubular metallic holder firmly connected to said tubular screen-mesh element at one end thereof and extending axially therefrom, said holder having window like openings formed therein, means mounting said tubular metallic holder with said tubular screen-mesh element freely extending therefrom, metallic supporting means connected with said screen-mesh element at the end thereof which is farthest away from said holder supporting said screen-mesh element at such end, and means for connecting current to said holder.

2. An electrode for use in an electron discharge tube comprising a tubular screen-mesh element, said screen-mesh element comprising wires disposed in mutually crossing relationship, said wires being secured together at crossing points thereof, an integral tubular metallic holder firmly connected to said tubular screen-mesh element at one end thereof and extending axially therefrom, the wall of said holder being of a latticed structure forming respectively axially and transversally extending ribs defining windowlike openings, the width of at least two of the axially extending ribs differing from that of the remaining similarly extending ribs, means mounting said tubular metallic holder with said tubular screen-mesh element freely extending therefrom, metallic suporting means connected with said screen-mesh element at the end thereof which is farthest away from said holder supporting said screen-mesh element at such end, and means for connecting current to said holder.

3. An electron discharge tube having an axially extending cathode and an axially extending anode which is radially spaced from said cathode and forming therewith an annular space and having a plurality of angularly displaced current supply means for said cathode; a grid electrode disposed within said annular space between said cathode and said anode, said grid electrode comprising a tubular screen-mesh element, said screen-mesh element comprising wires disposed in mutually crossing relationship, said wires secured together at crossing points thereof, an integral tubular metallic holder firmly connected to said tubular screen-mesh element at one end thereof and extending axially therefrom, the wall of said holder being a latticed structure forming respectively axially and transversally extending ribs defining windowlike openings, the width of a plurality of the axially extending ribs being greater than that of the remaining similarly extending ribs, said ribs of greater width being disposed respectively opposite said current supply means for said cathode.

4. An electrode for use in an electrical discharge tube comprising wires disposed in screen-mesh fashion in crossing relationship forming a tubular screen-mesh electrode member, said wires being secured together at crossing points thereof, an integral tubular metallic holder firmly connected to said tubular screen-mesh member at one end thereof and extending axially therefrom, means mounting said tubular metallic holder with said tubular screen-mesh member freely extending therefrom, metallic supporting means connected with said screen-mesh member at the end thereof which is farthest away from said holder supporting its structure at such end, and means for connecting current to said holder and to said supporting means, respectively, said holder having windowlike openings formed therein.

5. An electrode for use in an electrical discharge tube comprising wires disposed in screen-mesh fashion in crossing relationship forming a tubular screen-mesh electrode member, said wires being secured together at crossing points thereof, an integral tubular metallic holder firmly connected to said tubular screen-mesh member at one end thereof and extending axially therefrom, means mounting said tubular metallic holder with said tubular screen-mesh member freely extending therefrom, metallic supporting means connected with said screen-mesh member at the end thereof which is farthest away from said holder supporting its structure at such end, and means for connecting current to said holder and to said supporting means, respectively, said holder having windowlike openings formed therein and axially extending ribs of different widths extending between said openings.

References Cited in the file of this patent

UNITED STATES PATENTS

| Number | Name | Date |
|---|---|---|
| 1,353,976 | Stockle | Sept. 28, 1920 |
| 1,844,319 | Hatt | Feb. 9, 1932 |
| 1,933,109 | Hafecost | Oct. 31, 1933 |
| 1,984,897 | Rothe | Dec. 18, 1934 |
| 2,047,369 | Hickok | June 14, 1936 |
| 2,117,246 | Haglund | May 10, 1938 |
| 2,164,477 | Smith | July 4, 1939 |
| 2,165,135 | Garner | July 4, 1939 |
| 2,359,517 | Eitel et al. | Oct. 3, 1944 |
| 2,359,769 | Litton | Oct. 10, 1944 |
| 2,445,814 | Wing et al. | July 27, 1948 |
| 2,452,069 | Reed | Oct. 26, 1948 |